United States Patent
Highet et al.

(10) Patent No.: US 9,504,244 B2
(45) Date of Patent: *Nov. 29, 2016

(54) BAIT DISPENSING SYSTEM

(71) Applicant: R C Solutions Inc, Houston, TX (US)

(72) Inventors: Cheryl Leigh Highet, Houston, TX (US); Stephen C. Slagter, Naperville, IL (US); Roy Melling, Plainwell, MI (US); Leonard Scott Huff, Shekou (CN)

(73) Assignee: R C Solutions Inc, Houston, TX (US)

( * ) Notice: Subject to any disclaimer, the term of this patent is extended or adjusted under 35 U.S.C. 154(b) by 305 days.

This patent is subject to a terminal disclaimer.

(21) Appl. No.: 13/925,244

(22) Filed: Jun. 24, 2013

(65) Prior Publication Data

US 2013/0276356 A1 Oct. 24, 2013

Related U.S. Application Data

(63) Continuation of application No. 12/281,825, filed as application No. PCT/US2006/031848 on Aug. 16, 2006, now Pat. No. 8,490,324.

(60) Provisional application No. 60/781,839, filed on Mar. 13, 2006.

(51) Int. Cl.
*A01M 25/00* (2006.01)
*B65F 1/14* (2006.01)

(52) U.S. Cl.
CPC ........... *A01M 25/004* (2013.01); *A01M 25/00* (2013.01); *A01M 25/002* (2013.01); *B65F 1/1473* (2013.01); *B65F 2210/156* (2013.01)

(58) Field of Classification Search
CPC ............ A01M 25/00; A01M 25/002; A01M 25/004; A01M 1/20; A01M 1/2005; A01M 1/2011; A01M 1/2016

USPC ................ 43/131, 120; 301/111.01, 111.03, 301/111.05, 105.1, 112–122, 111.04; 220/908, 908.2

See application file for complete search history.

(56) References Cited

U.S. PATENT DOCUMENTS

| | | | | |
|---|---|---|---|---|
| 759,030 | A | * | 5/1904 | Sheaffer ........................ 43/131 |
| 1,223,525 | A | * | 4/1917 | Schallman ..................... 43/120 |

(Continued)

FOREIGN PATENT DOCUMENTS

| | | | | |
|---|---|---|---|---|
| EP | 134031 | A2 * | 3/1985 | ............ A01M 25/00 |
| EP | 1201124 | A2 * | 5/2002 | ............ A01M 25/00 |

(Continued)

OTHER PUBLICATIONS

Supplementary European Search Report dated Nov. 4, 2013, 5 pages based on PCT/US2006031848 filed Aug. 16, 2006.

(Continued)

*Primary Examiner* — Darren W Ark
(74) *Attorney, Agent, or Firm* — Charles S. Knobloch; Arnold, Knobloch & Saunders, L.L.P.

(57) ABSTRACT

Provided is a system and method for dispensing bait for the monitoring or control of pests. A garbage container includes garbage a storage member and a wheel assembly, which supports the storage member. The wheel assembly includes at least one wheel member and an axle joining the wheel member to the garbage storage member. A bait holding station is located inside the wheel member. Pests may enter the interior of the wheel member through an entrance aperture formed in a wall of the wheel member, such as an axle-engaging portion of the wheel member.

4 Claims, 7 Drawing Sheets

(56) References Cited

U.S. PATENT DOCUMENTS

| | | | |
|---|---|---|---|
| 1,223,873 A * | 4/1917 | Hartt | 43/120 |
| 1,350,402 A * | 8/1920 | Cereghino | 43/120 |
| 1,472,476 A * | 10/1923 | Kendzierski | 43/120 |
| 1,815,595 A * | 7/1931 | Simpson | 43/131 |
| 1,955,496 A * | 4/1934 | Harris | 43/120 |
| 1,960,464 A * | 5/1934 | Thalheimer | 43/131 |
| 1,994,859 A | 3/1935 | Langum | |
| 2,252,812 A * | 8/1941 | McAnlis | 43/120 |
| 2,297,193 A * | 9/1942 | Silverman | 43/120 |
| 2,356,022 A * | 8/1944 | Wright | 43/120 |
| 2,492,957 A * | 1/1950 | Blair | 43/120 |
| 3,098,703 A * | 7/1963 | Snyder et al. | 43/120 |
| 3,321,863 A * | 5/1967 | Maxam, Jr. | 301/111.03 |
| 3,427,743 A * | 2/1969 | Brunner et al. | 43/131 |
| 3,488,879 A * | 1/1970 | Laughlin | 43/131 |
| 3,661,326 A * | 5/1972 | Wilson | 43/120 |
| 3,704,539 A * | 12/1972 | Alvarez | 43/131 |
| 3,772,820 A * | 11/1973 | Bond | 43/131 |
| 4,043,685 A * | 8/1977 | Hyams | 301/121 |
| 4,194,690 A * | 3/1980 | Stever et al. | 43/131 |
| 4,208,829 A * | 6/1980 | Manning | 43/131 |
| 4,251,946 A * | 2/1981 | Lindley | 43/131 |
| 4,660,320 A * | 4/1987 | Baker et al. | 43/131 |
| 4,674,759 A * | 6/1987 | Parker | 220/908 |
| 5,152,097 A * | 10/1992 | Rhodes | 43/131 |
| 5,215,356 A * | 6/1993 | Lin | 301/119 |
| 5,218,782 A * | 6/1993 | Null et al. | 43/120 |
| 5,397,033 A * | 3/1995 | Blomquist | 43/131 |
| 5,440,833 A * | 8/1995 | Stoll | 43/124 |
| 5,522,172 A | 6/1996 | Clark | |
| 5,628,143 A * | 5/1997 | Doucette | 43/131 |
| 5,636,470 A * | 6/1997 | Blomquist | 43/131 |
| 5,657,575 A * | 8/1997 | Miller et al. | 43/131 |
| 5,716,107 A * | 2/1998 | Parker et al. | 301/121 |
| 5,749,168 A * | 5/1998 | Chrysanthis | 43/131 |
| 5,884,982 A * | 3/1999 | Yemini | 301/111.03 |
| 5,943,816 A * | 8/1999 | Hyatt et al. | 43/131 |
| 6,145,242 A * | 11/2000 | Simpson | 43/131 |
| 6,192,621 B1 * | 2/2001 | Fain | 43/131 |
| 6,272,791 B1 * | 8/2001 | Pleasants | 43/131 |
| 6,280,001 B1 * | 8/2001 | Parker et al. | 301/111.03 |
| 6,328,320 B1 * | 12/2001 | Walski et al. | 220/908 |
| 6,361,121 B1 * | 3/2002 | Morris | 301/112 |
| 6,470,622 B1 * | 10/2002 | Braun | 43/131 |
| 6,474,015 B1 * | 11/2002 | Lund et al. | 43/131 |
| 6,594,948 B1 * | 7/2003 | Novack | 43/131 |
| 6,637,835 B2 * | 10/2003 | Morris | 301/111.01 |
| 6,655,079 B1 * | 12/2003 | Bernard et al. | 43/131 |
| 6,739,087 B2 | 5/2004 | Weiser et al. | |
| 6,789,352 B2 | 9/2004 | Price et al. | |
| 6,807,768 B2 | 10/2004 | Johnson et al. | |
| 6,860,060 B2 * | 3/2005 | Hayes et al. | 43/131 |
| 6,874,274 B2 | 4/2005 | Townsend | |
| 6,932,436 B2 * | 8/2005 | Chae | 301/111.01 |
| 7,325,358 B1 * | 2/2008 | Chalupsky et al. | 43/131 |
| 7,987,629 B2 * | 8/2011 | Harper | 43/131 |
| 8,490,324 B2 * | 7/2013 | Highet et al. | 43/131 |
| 8,701,336 B2 * | 4/2014 | Kay | 43/131 |
| 8,701,337 B2 * | 4/2014 | Kay | 43/131 |
| 9,258,991 B2 * | 2/2016 | Harper | A01M 25/004 |
| 2004/0088905 A1 | 5/2004 | Price et al. | |
| 2004/0181996 A1 | 9/2004 | Johnson et al. | |
| 2004/0183358 A1 * | 9/2004 | Chuang | 301/6.5 |
| 2004/0187378 A1 | 9/2004 | Cink et al. | |
| 2004/0200134 A1 | 10/2004 | Cink et al. | |
| 2008/0163541 A1 * | 7/2008 | Harris | 43/120 |
| 2009/0139133 A1 | 6/2009 | Harper | |
| 2010/0013294 A1 * | 1/2010 | Chan | 301/120 |
| 2012/0036763 A1 | 2/2012 | Kay | |
| 2012/0074663 A1 * | 3/2012 | Parker et al. | 301/111.01 |
| 2012/0153586 A1 * | 6/2012 | Morris | 301/111.01 |
| 2012/0311918 A1 | 12/2012 | Kay | |
| 2015/0342171 A1 * | 12/2015 | Seyss | A01M 25/004 43/58 |

FOREIGN PATENT DOCUMENTS

| | | | | |
|---|---|---|---|---|
| GB | 2023987 A * | 1/1980 | | A01M 25/00 |
| WO | 2004098281 A1 | 11/2004 | | |
| WO | WO 2004098281 A1 * | 11/2004 | | A01M 25/00 |
| WO | 2007120068 A1 | 10/2007 | | |
| WO | WO 2007120068 A1 * | 10/2007 | | A01M 25/00 |

OTHER PUBLICATIONS

Office action from Canadian Intellectual Property Office dated Aug. 22, 2012, 3 pages, Application No. 2,681,087.

Office action from Canadian Intellectual Property Office dated Aug. 21, 2013, 2 pages, Application No. 2,681,087.

* cited by examiner

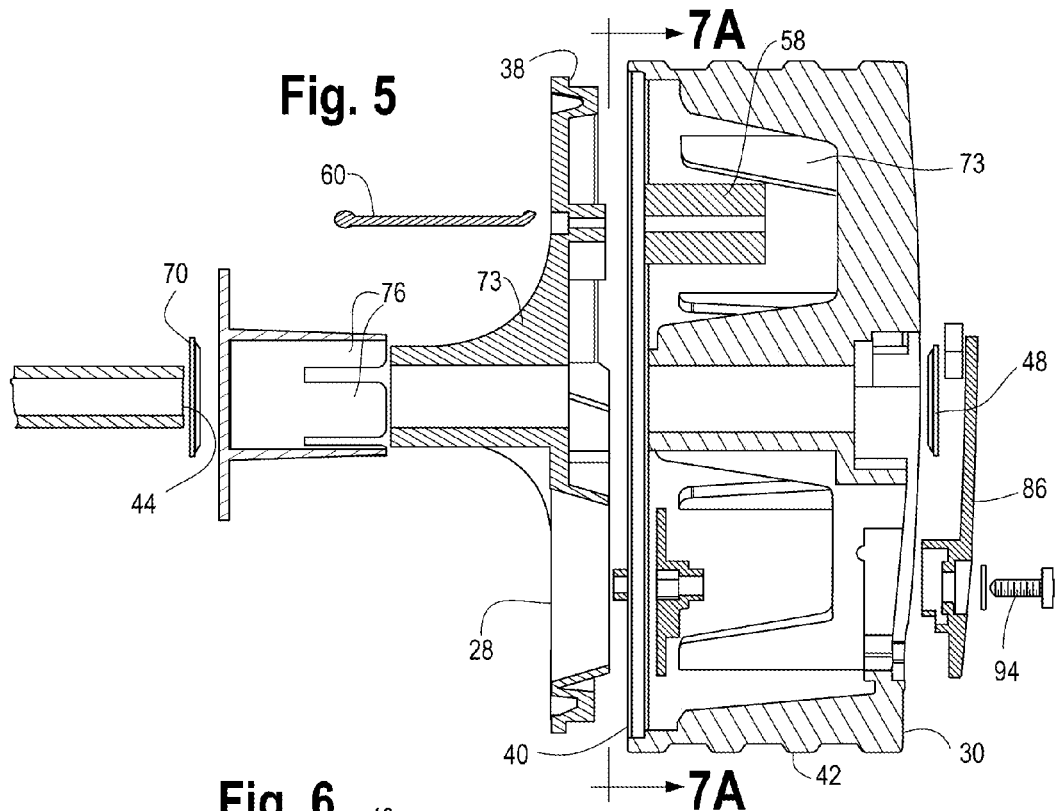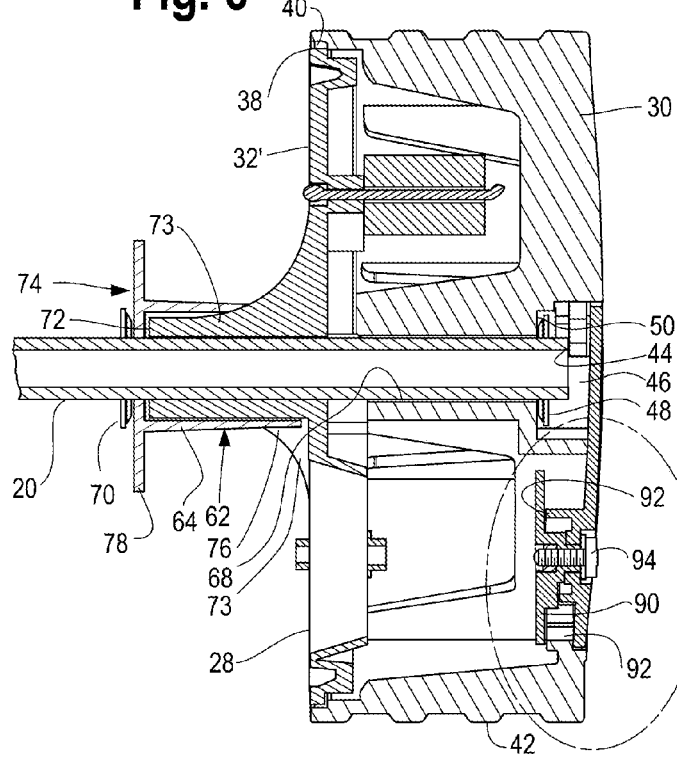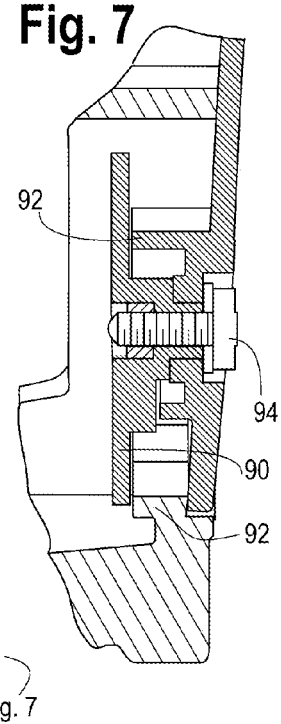

BAIT DISPENSING SYSTEM

TECHNICAL FIELD

The present invention relates generally to bait dispensers and, more particularly, to a mobile bait dispensing system for pests.

BACKGROUND ART

Various bait stations have previously been advanced for dispensing poisoned bait to rodents and similar pests. One, which is illustrated in U.S. Pat. No. 6,807,768, issued on Oct. 26, 2004, consists of a molded plastic base containing a labyrinthine interior where blocks of solid poisoned bait are mounted. The base is set down on a relatively flat surface where it stays, and the rodents come there to feed. The base is covered by a lid, which is fastened closed by a latch. Feet are provided on the underside of the base in order to raise it above the surface upon which it was set and prevent moisture from entering the bait chambers.

A similar stationary trap is illustrated in U.S. Pat. No. 6,739,087, issued on May 25, 2004. It is intended to trap snails, slugs or the like. It has a flat base and a labyrinthine interior. A cover rests on top of the labyrinth, and the base of the trap is surrounded by a flange for the pests to crawl up on as they enter the interior of the trap where the bait is disposed.

Another flat-based station is shown in U.S. Pat. No. 6,789,352. A disposable bait carrier is placed inside the base in such a manner that it is difficult to dislodge it if the base is moved.

Other stations hang, as illustrated in U.S. Pat. No. 5,522,172, issued Jun. 4, 1996, and some are contained in trays which roll on casters for supporting various objects in an insect-free environment, as illustrated in U.S. Pat. No. 5,440,833 for example. A combined bait station and garbage can support is disclosed in U.S. Pat. No. 3,488,879, illustrating a support held in place by a spike driven through the base plate of the station into a surface, such as earth or pavement, below the support A further combination of a garbage can and bait station is shown in U.S. Pat. No. 6,470,622 which issued on Oct. 29, 2002. That patent discloses a garbage container in the form of a large tub mounted on wheels. The upper portion of the tub is a compartment for garbage, while below the garbage compartment there is another compartment containing poisoned bait, which the rodents can access through entrance/exit holes in the wall of the container.

The variety of the foregoing structures and their relatively recent appearance suggest that more convenient and improved poisoned bait dispensing systems are needed. The present invention addresses many of these needs, namely, the need for ease of portability as well as the need for safely dispensing a poison in a place where pests are naturally attracted anyway and in an unobtrusive, unnoticeable manner.

DISCLOSURE OF THE INVENTION

According to one example of the invention, a system for dispensing bait from a station is readily rolled from place to place and is easily accessible to small pests such as rodents, which are attracted to the station. The bait is inaccessible to non-target animals such as dogs or cats, and it is safely stored where children cannot get it and where it will not spill as the station is moved.

In a more particular example of the invention, a garbage (or other purpose) container mounted on wheels is used. At least one of the wheels is hollow and has an access port leading to the interior of the wheel where the bait is placed and maintained.

A further example uses a garbage (or other purpose) container, which may be of either residential or commercial size. A wheel assembly supports the garbage storage member while it is standing still and as it is rolled from place to place on a relatively flat surface. In the wheel assembly there is a wheel member and an axle joining the wheel member to the garbage storage member. A bait holding station is located inside the inside the wheel member which is accessible to pests through a wall of the wheel member. One manner of constructing the wheel member includes making it in two principal parts, namely, an axle-engaging portion, which has an exterior surface facing outwardly from the wheel member and an interior surface facing inside the wheel member, and a cover portion, which overlies the interior surface of the axle-engaging portion. Together, the cover portion and the axle-engaging portion enclose a chamber between them inside the wheel member.

According to another example of the invention, there is provided a container for dispensing poisoned bait to pests. The garbage container has a garbage storage member and a wheel assembly supporting the storage member. The wheel assembly may provide support while the storage member is standing still and may also as the storage member is rolled from place to place. The wheel assembly includes a wheel member, an axle joining the wheel member to the garbage storage member, and a bait holding station inside the wheel member. The holding station is accessible to pests in an opening through a wall of the wheel member.

In these and further examples of the invention, it will be apparent that means are provided for placing a bait station in close proximity to a pest attraction, making it possible to do so without additional effort, making the placement of the overall container typically unnoticeable to passersby, and does so in a consistently safe way.

According to one set of examples of the present invention, there is provided a system comprising: means for maintaining a bait station separable from a rotationally mobile container in connection with said rotationally mobile container; means for securing bait in the bait station from spillage during motion of the rotationally mobile container; and means for accessing the bait.

In another example, the above-described system includes means for protecting the bait from contamination.

In another example, the above-described system includes means for concealing the bait station. In a further example, the means for concealing the bait station includes: a wheel member; and a bait holding station disposed inside the wheel member accessible to pests through an opening into the wheel member.

In another example, the above-described system includes: means for protecting the bait from contamination and means for concealing the bait station.

In another example, the means for maintaining a bait station separable from a rotationally mobile container in connection with the rotationally mobile container of the above-described system includes: a wheel member; and a bait holding station disposed inside the wheel member accessible to pests through an opening of said wheel member. In a further example, the means for maintaining a bait station separable from a rotationally mobile container in connection with the rotationally mobile container further includes: a storage member; and a wheel assembly supporting the storage member, the wheel assembly including: the wheel member; and an axle joining the wheel member to the storage member.

In another example, the means for securing bait in the bait station from spillage during motion of the rotationally mobile container of the above-described system includes: an axle engaging portion having an exterior surface and an interior surface, the exterior surface facing outward from the container; a cover portion overlying the interior surface of the axle engaging portion of the wheel member; and a chamber disposed inside the wheel member between the axle engaging portion and the cover portion; wherein the axle engaging portion of the wheel member further includes a first track along the outer perimeter of the wheel member; the cover portion of the wheel member further includes a second track; and the second track is disposed in and rotationally moveable along the first track, thereby providing rotational mobility of the cover portion.

In another example, the means for securing bait in the bait station from spillage during motion of the rotationally mobile container of the above-described system includes: a wheel member; a bait holding station disposed inside said wheel member; an entrance aperture disposed on said wheel member; and means to maintain said entrance aperture above the nadir of said wheel member.

In another example, the means for accessing the bait of the above-described system includes: a wheel member; a bait holding station disposed inside said wheel member; and an entrance aperture disposed on said wheel member.

In another example, the means for accessing the bait of the above-described system further includes ribs disposed inside the wheel member, thereby forming a passageway between the entrance aperture and the bait holding station. In a further example, the means for accessing the bait further includes a labyrinthine interior, thereby forming a passageway between the entrance aperture and the bait holding station.

According to another set of examples of the present invention, there is provided a method comprising the steps of: maintaining a bait station separable from a rotationally mobile container in connection with said rotationally mobile container; securing bait in said bait station from spillage during motion of said rotationally mobile container; and providing access to the bait.

In another example, the above-described method further includes the step of protecting the bait from contamination.

In another example, the above-described method further includes the step of concealing said bait station.

In another example, the above-described method further includes the steps of: protecting the bait from contamination; and concealing said bait station.

According to another set of examples of the present invention, there is provided a container for dispensing bait comprising: a storage member; and a wheel assembly supporting the storage member. The wheel assembly comprises: a wheel member; an axle joining the wheel member to the storage member; and a bait holding station disposed inside the wheel member accessible to pests through an opening into the wheel member.

In another example, the wheel member of the above-described container includes a plurality of stalls for bait inside the wheel member.

In another example, the above described container further includes: an axle engaging portion having an exterior surface and an interior surface, the exterior surface facing outward from the container; a cover portion overlying the interior surface of the axle engaging portion of the wheel member; and a chamber disposed inside the wheel member between the axle engaging portion and the cover portion. In a further example, the axle-engaging portion of the wheel member further includes an entrance aperture leading to the chamber. In a further example, the axle-engaging portion of the wheel member includes a first track along its outer perimeter, and the cover portion includes a second track disposed in and moveable along the first track as the cover portion is rotated. In a further example, ribs are formed inside the cover portion, arranged to form passageways between the entrance aperture for the pests and the bait holding station, limiting access to the bait to the pests. In a further example, the ribs are joined to the cover portion and provide support inside the wheel member for internally strengthening the cover portion. In a further example, the entrance aperture for the pests through the axle-engaging portion of the wheel member is maintained above the nadir of the wheel member.

In another example, the wheel member of the above described container includes a hub fixed on the axle engaging portion of the wheel member and a hub lock engaged on the hub and the axle, maintaining the position of the axle engaging portion of the wheel member on the axle during rotation of the cover portion of the wheel member. In a further example, a stop is included on the garbage storage member, engaging the hub lock in a non-rotational engagement with the garbage storage member. In a further example, the hub includes a sleeve portion extending outwardly from the axle engaging portion of the wheel member and having a central aperture arranged to receive the axle. In a further example, the cover portion of the wheel member includes a socket arranged to receive an end portion of the axle inside the wheel member adjacent the sleeve portion of the hub.

In another example, the cover portion of the wheel member of the above-described container includes a port extending through the cover portion and arranged to expose the bait holding station. In a further example, the cover portion of the wheel member includes a cap engaged on edges of the port and closing the port. In a further example, a lock is mounted on the cap arranged to maintain the cap in position closing the port. In a further example, the cap includes means to unlock the cap, the unlocking means comprises a key tool.

In another example, the bait holding station of the above-described container is formed to hold liquid bait.

In another example, the bait holding station of the above-described container is formed to hold solid bait.

According to another set of examples of the present invention, there is provided an assembly for dispensing bait comprising: a hollow wheel member for a container, the hollow wheel member having an opening into the wheel member, and a bait holding station inside the hollow wheel member, the bait holding station accessible to the pests through the opening of the wheel member.

In a further example of the above-described assembly, the hollow wheel member includes a plurality of stalls for the bait inside the wheel member.

In a further example of the above-described assembly, the hollow wheel member includes an axle-engaging portion having an exterior surface and an interior surface. A cover portion overlies the interior surface of the axle-engaging portion and encloses a chamber inside the wheel member between the axle engaging portion and the cover portion. In a further example, the axle-engaging portion is provided with an entrance aperture for the pests leading to the chamber. In a further example, ribs formed inside the cover portion are arranged to form passageways between the entrance aperture for the pests and the bait station and limit access to the bait to the pests. In a further example, the ribs are joined to the cover portion and arranged to provide support inside the wheel member for internally strengthening the cover portion.

In a further example, the hollow wheel member of the above-described assembly includes a hub fixed on the axle engaging portion of the wheel member, and a hub lock engaged on the hub and disposed to maintain the position of the wheel member on an axle during rotation of the wheel member. In a further example, the hub includes a sleeve portion extending outwardly from the axle engaging portion of the wheel member and having a central aperture arranged to receive an axle. In a further example, the cover portion of the wheel member includes a socket arranged to receive an end portion of an axle inside the wheel member adjacent the sleeve portion of the hub. In a further example, the cover portion of the wheel member includes a port extending through the cover portion and arranged to expose the bait holding station. In a further example, the cover portion of the wheel member includes a cap engaged upon edges of the port and disposed in a position closing the port. In a further example, a lock is mounted on the cap maintaining the cap in a position closing the port. In a further example, the lock is opened using a key tool.

In another example, the cover portion of the above-described assembly includes locking members arranged to engage the cover portion on the axle-engaging portion. In a further example, the locking members are affixed to and moveable with the cover portion for selectively engaging the locking members and the cover portion into a fixed position on the axle engaging portion. In a further example, a wrench socket is provided in the cover portion and arranged to connect a wrench to the cover portion, whereby torque from the wrench may be transmitted to the cover portion and the locking members.

In a further example, the bait station of the above-described assembly is mounted inside the axle-engaging portion.

In another example, the bait holding station of the above-described assembly is formed to hold liquid bait.

In another example, the bait holding station of the above-described assembly is formed to hold solid bait.

In further examples of the present invention, the bait used may be toxic or non-toxic. The bait used may be a poison, used for monitoring, or used for tracking. The bait may include pheromones or radioisotopes.

In further examples of the present invention, the system may be used as a monitoring, tracking, or trapping system for targeted pests.

Other objects and features of the examples of this invention will be apparent to those persons who are skilled in the practical art of designing and using various forms of bait stations as well as to those persons who are particularly skilled in applying methods of pest control in populated areas, especially after an examination of the following description of the examples of the present invention and of the accompanying drawings.

From all of the foregoing it will be evident that, although particular forms of the invention have been illustrated and described, nevertheless various modifications can be made without departing from the true spirit and scope of the invention.

BRIEF DESCRIPTION OF DRAWINGS

The present invention and its advantages will be better understood by referring to the following detailed description and the attached drawings in which:

FIG. 5 is an exploded sectional view of the garbage container wheel shown in FIG. 3;

FIG. 6 is a sectional view of the container wheel shown in FIG. 5 showing the elements of the wheel after being assembled;

FIG. 7 is an enlarged sectional view of the circled portion of the wheel shown in FIG. 6;

REFERENCE NUMERALS IN DRAWINGS

Figure 1:
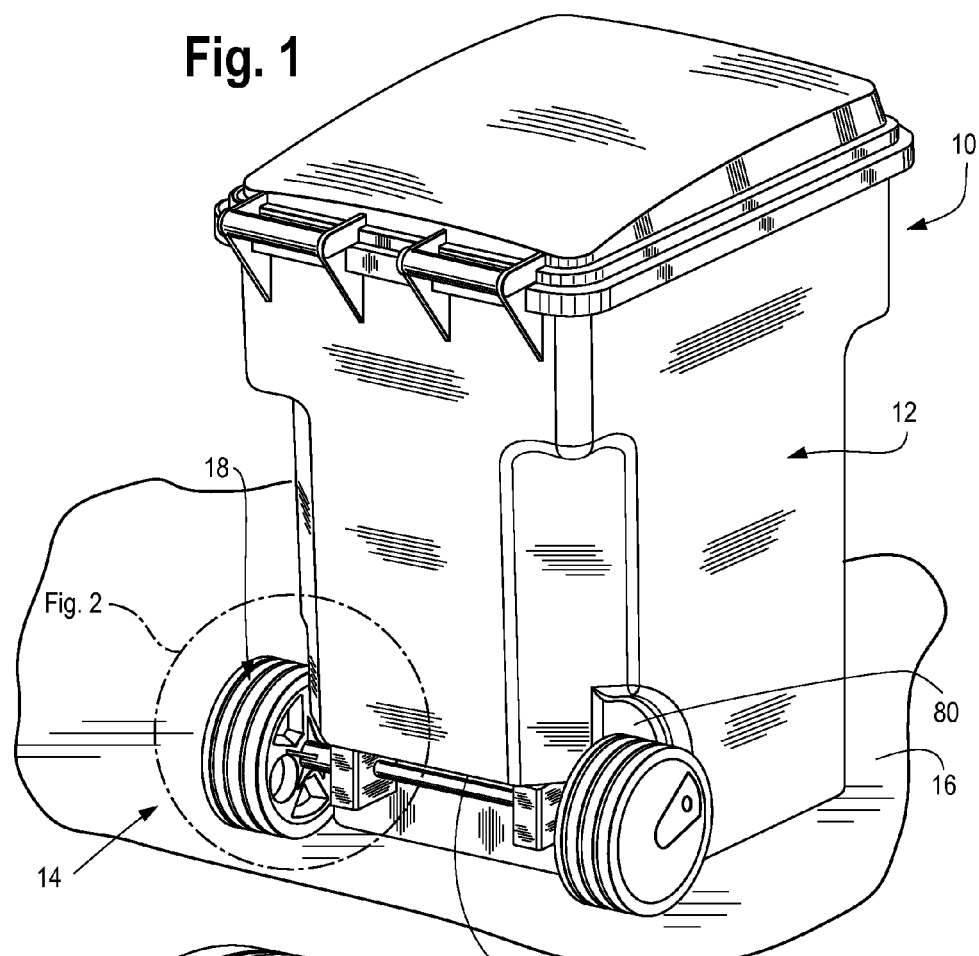
FIG. 1 is a perspective view of a garbage container, which can be rolled from place to place with a poisoned bait station in each of its wheels.

The following elements are numbered as described in the drawings and detailed description of the invention:

10 garbage container
12 garbage storage member
14 wheel assembly
16 plot
18 wheel member
20 axle
22 bait holding station
24 pests
26 entrance aperture
28 axle-engaging portion
30 cover portion
32 exterior surface
32' exterior surface
34 interior surface
38 track 38
40 second track, track 40
42 tread surface
44 distal end portion
46 socket
48 clamp 48
50 seat
52 ribs
54 interior surface of wheel member 18
56 passageways
58 bait block
58A liquid bait -continued 60 bait holding pin
62 hub
64 sleeve portion
66 centrally apertured portion
68 stabilizing sleeve
70 clamp
72 outer end of sleeve portion 64
73 fins
74 hub lock
76 fingers
78 rectangular plate
80 wheel well
82 wall portion
84 port
86 cap
88 disk-shaped member
90 teeth
92 ledges
94 lock-operating member
96 engagement dimples
98 wrench-type tool
100 prongs
118 wheel member
130 axle-engaging portion
132 interior surface
134 cover portion
136 locking members
138 lip
140 tool
141 latch
142 entrance apertures
144 bait stations
146 rib members
148 stalls
150 tread surface
152 axle receiving sleeve

MODES FOR CARRYING OUT THE INVENTION

Each of FIGS. 1-11 illustrate examples of the bait dispensing system to produce various aspects of the present invention, though these particular embodiments are illustrated and described herein only for exemplary purposes. Moreover, variations of the system and methods of utilizing the same will become apparent to those of ordinary skill in the relevant structural and mechanical arts upon reading the following disclosure. Thus, the present invention is not to be considered limited to only the structures, systems, and methods described herein.

FIG. 1 is a perspective view of a garbage container 10, which can be rolled from place to place with a poisoned bait station in each of its wheels. Although a container for holding garbage is illustrated in this example, the purpose or use of the container is not critical to operation of the invention. Garbage container 10 includes a garbage storage member 12 and a wheel assembly 14. Wheel assembly 14 supports storage member 12 such that container 10 may be rolled from place to place on a relatively flat surface, such as plot 16, and is also supported while container 10 is standing still.

Wheel assembly 14 includes at least one wheel member 18 with an axle 20 joining wheel member 18 to garbage storage member 12. As will be illustrated in FIG. 3, a bait holding station 22 is located inside wheel member 18. While the container 10, as illustrated in FIG. 1, has a pair of wheel members like wheel member 18, there may be more wheel members, or fewer, to support the container 10. Incidentally, wheel well 80 is illustrated for reference. Locating a bait holding station inside a wheel member provides a means for maintaining a bait station that is separate from, but kept in connection with, its rolling container.

Figure 2:
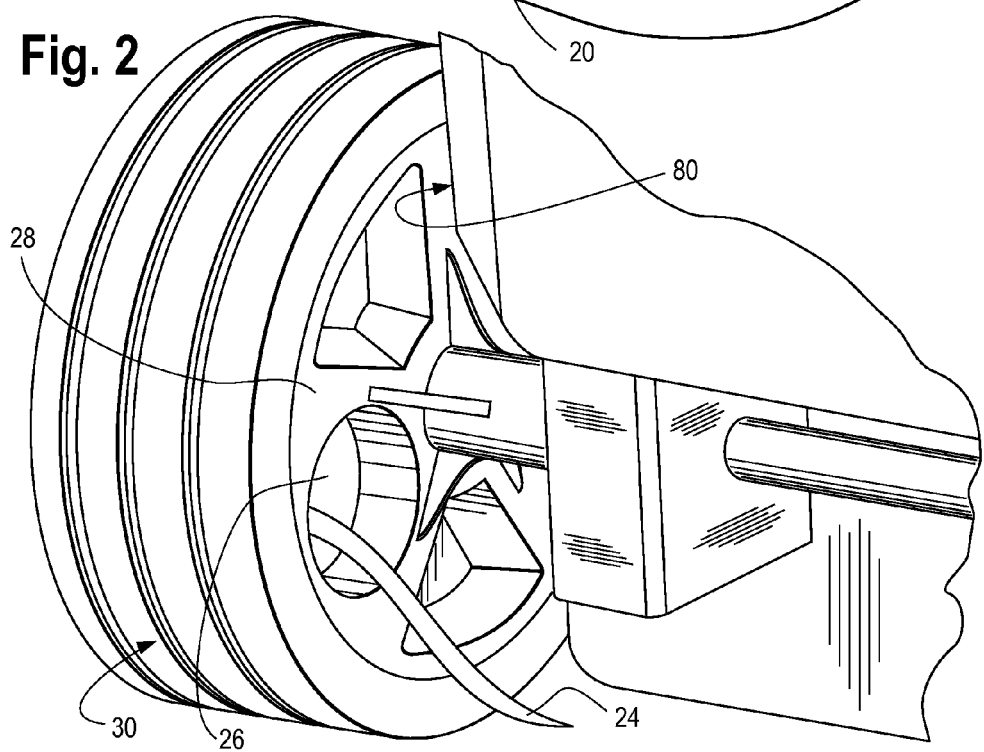
FIG. 2 is an enlarged perspective view of a portion of the garbage container circled in FIG. 1, and also showing a portion of a pest entering one of the container's wheels.

FIG. 2 is an enlarged perspective view of a portion of garbage container 10, wheel assembly 14, as circled in FIG. 1. FIG. 2 further illustrates a portion of a pest 24 entering wheel member 18. Pests 24 may enter the interior of wheel member 18 through an entrance aperture 26 formed in a wall of the wheel member, such as the axle-engaging portion 28 of wheel member 18. Wheel member 18 also includes a cover portion 30, which overlies and engages the axle engaging portion 28, forming a chamber inside wheel member 18 between axle engaging portion 28 and the cover portion 30. Wheel well 80 is illustrated for reference.

Figure 3:
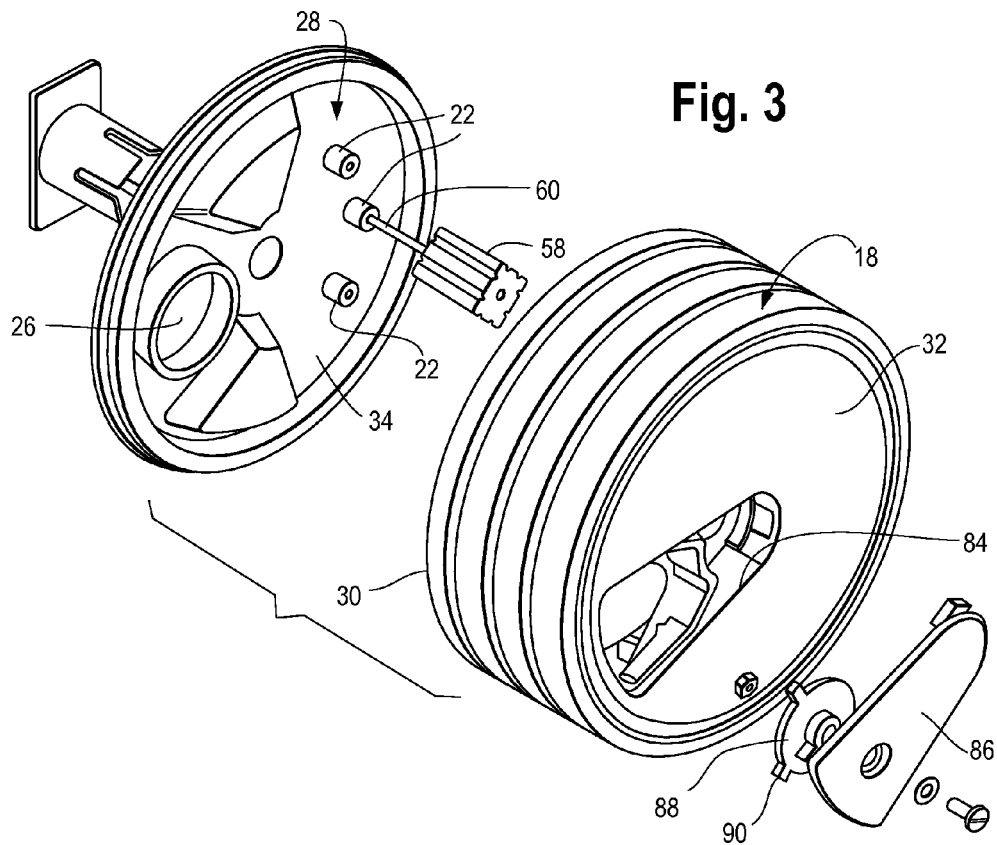
FIG. 3 is an enlarged exploded view in perspective of one of the container wheels shown in FIG. 1.

FIG. 3 is an enlarged exploded view in perspective of one of the container wheels shown in FIG. 1, illustrating a means for concealing the bait station. FIG. 3 particularly shows the exterior surface 32 facing outwardly from wheel member 18 and the interior surface 34 of axle engaging portion 28 facing inside of the wheel member 18. Cover portion 30 overlies the interior surface 34 to form and enclose the chamber between axle engaging portion 28 and the cover portion 30.

Other elements are illustrated which will be detailed further in the following figures, providing means for protecting the bait from contamination while providing means for accessing the bait. Bait holding stations 22 are disposed on interior surface 34 of axle engaging portion 28. Bait holding pin 60 connects to bait holding station 22. Bait block 58 attaches to bait holding pin 60. Entrance aperture 26 is formed in the wall of wheel member 18, interior surface 34. Port 84 is formed through exterior surface 32, providing access to the interior of wheel member 18. A cap 86 covers or otherwise encloses port 84. Disk-shaped member 88 is attached to cap 86. Teeth 90 on disk-shaped member 88 serve as a means to lock cap 86 in place.

Figure 4:
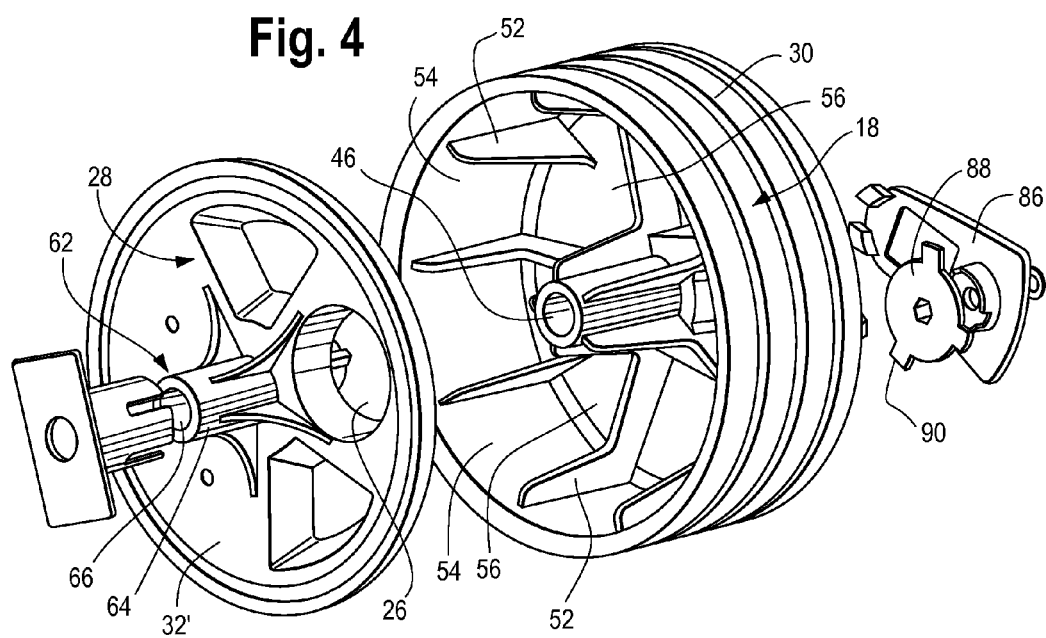
FIG. 4 is an exploded view of the garbage container wheel shown in FIG. 3.

FIG. 4 is an exploded view of the garbage container wheel shown in FIG. 3. FIG. 4 particularly shows the interior surface 54 of wheel member 18 and the exterior surface 32' of axle engaging portion 28 facing outwardly from of wheel member 18.

Other elements are illustrated which will be detailed further in the following figures. Hub 62 forms a portion of the exterior surface 32. Hub 62 includes a sleeve portion 64 and a centrally apertured portion 66. Hub lock 74 attaches around hub 62. The interior of wheel member 18 includes an axle receiving socket 46 and fins 52, which form passageways 56. The internal side of cap 86, disk-shaped member 88 and teeth 90 are illustrated for reference.

Figure 3A:
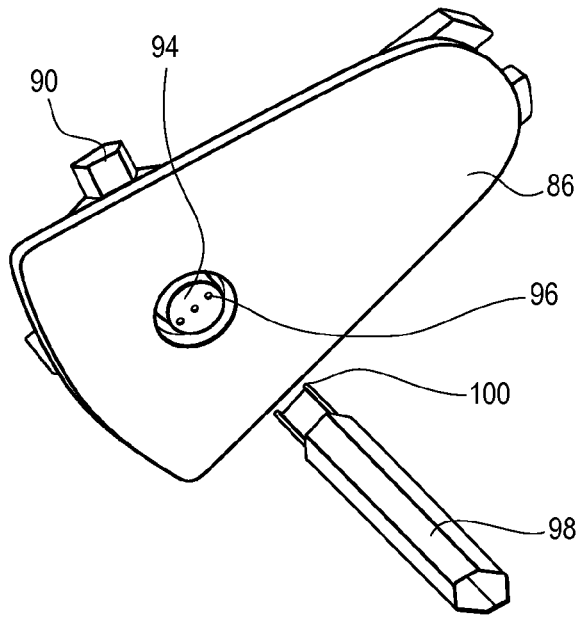
FIG. 3A is a perspective view of a modified part of the garbage container wheel shown in FIG. 3, and including a tool for operating the part.

FIG. 3A is a perspective view of a modified part of the garbage container wheel shown in FIG. 3, and including a tool for operating the part. The external side of cap 86 includes a recessed lock-operating member 94. Indented engagement dimples 96 are disposed on lock-operating member 94. Prongs 100 on a wrench-type tool 98 fit engagement dimples 96.

Figure 4A:
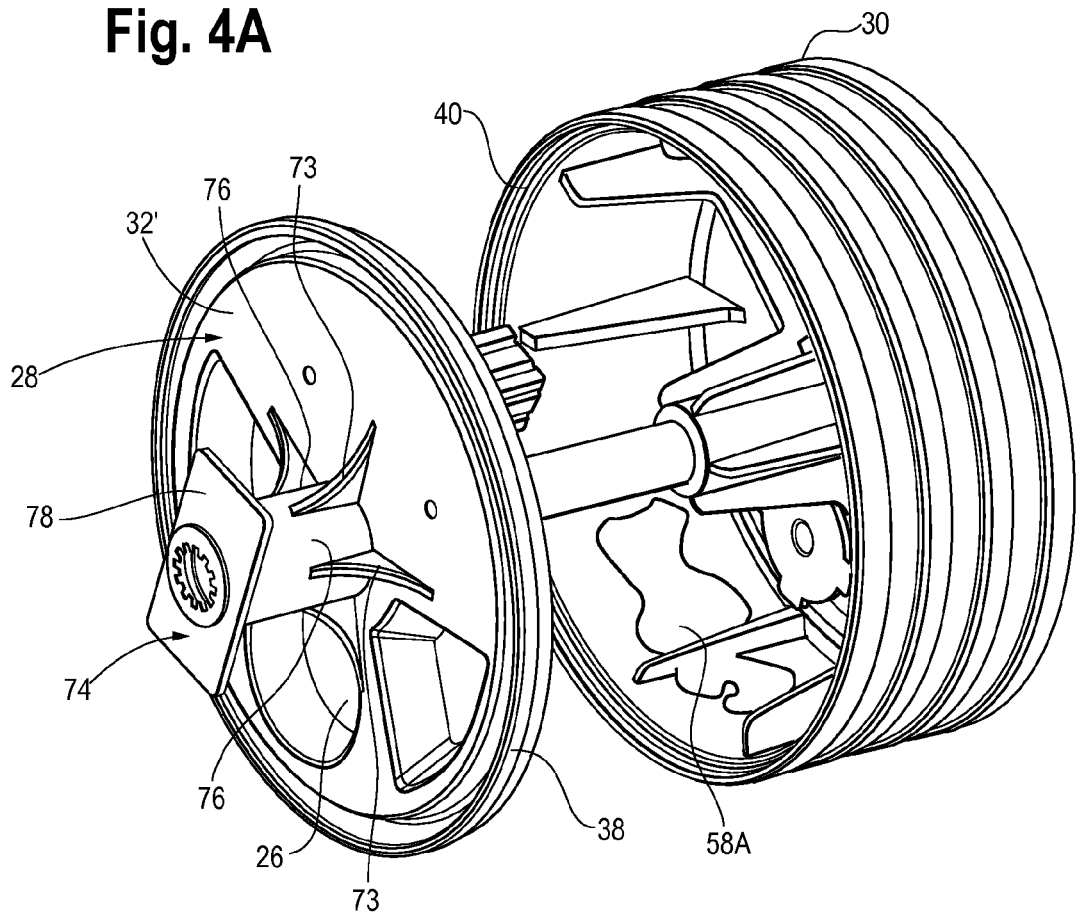
FIG. 4A is a perspective view of the container wheel shown in FIG. 4 partially assembled.

FIG. 4A is a perspective view of the container wheel shown in FIG. 4 partially assembled. Entrance aperture 26 is illustrated for reference. Fingers 76 on one end of hub lock 74 surround fins 73. A rectangular plate 78 is disposed on the other end of hub lock 74. A first track 38 encircles the perimeter of axle-engaging portion 28. A second track 40 encircles the interior of the outer perimeter of cover portion 30. Liquid bait 58A is disposed in the interior of the wheel.

FIG. 5 is an exploded sectional view of the garbage container wheel shown in FIG. 3. FIG. 6 is a sectional view of the container wheel shown in FIG. 5 showing the elements of the wheel after being assembled. FIGS. 5 and 6, along with FIGS. 3 and 4, illustrate how axle-engaging portion 28 engages cover portion 30 of wheel member 18. Axle-engaging portion 28, as will be explained hereafter, remains in a non-rotational attitude on axle 20, while cover portion 30 is constructed to rotate on axle 20 and axle-engaging portion 28. Such rotation is accomplished by forming complementary track members 38 and 40 on axle-engaging portion 28 and cover portion 30. The examples shown here illustrate various means for securing the bait from spillage during motion of the container.

First track 38 is located along the outer perimeter of axle-engaging portion 28. A complementary second track 40 is formed along the outer perimeter of cover portion 30. Second track 40 is disposed in and moves along first track 38 as cover portion 30 is rotated. The outer surface of cover portion 30 includes a tread surface 42, which contacts the flat surface of plot 16. When container 10 is pushed across the surface of plot 16, supported on the wheel assembly, tread surface 42 is advanced, rotating cover portion 30 and moving second track 40 along first track 38. Distal end portion 44 of axle 20 is nested in socket 46 (illustrated in FIG. 6) formed inside the cover portion 30 and is maintained there by a clamp 48 or similar locking means engaged on axle 20. Clamp 48 also slides rotationally on a seat 50 formed in the cover portion 30, thus keeping second track 40 in constant engagement with first track 38.

Various means may be used to control access to the bait. Inside the chamber formed by axle-engaging portion 28 and cover portion 30, several ribs 52 are arranged on cover portion 30. Ribs 52 provide a series of connecting stalls and form passageways 56 between the entrance aperture 26 and the bait holding station 22. The tortuous course of the passageways can readily be traversed by a pest, but access to bait block 58 in bait holding station 22 is limited to the pests which are targeted by this invention, and access to non-targeted animals and children is denied.

In addition to providing passageways between the entrance aperture and the bait station, or to a plurality of bait stations if the interior of the chamber is so designed, ribs 52, when firmly joined to cover portion 30, provide internal strength to the cover portion. The internal structural design of cover portion 30 may be designed to hold a solid bait in block form, such as bait block 58 impaled on a bait holding pin 60, or be arranged, alternatively, to utilize granulated bait sprinkled in place or held in a bag. Similarly, a liquid bait may be used such as bait 58A (as illustrated in FIG. 4A).

Since axle-engaging portion 28 of wheel member 18 is non-rotationally mounted on axle 20, entrance aperture 26 can be maintained above the nadir of wheel member 18. Consequently, bait specimens, either in crumb form or liquid remains, coming to rest on the bottom of the wheel's internal chamber do not fall out and do not become available to non-targeted subjects.

Axle engaging portion 28 includes a hub 62 fixed in the center of the axle-engaging portion. A sleeve portion 64 of hub 62 extends outwardly from axle-engaging portion 28 and includes a centrally apertured portion 66 arranged to receive axle 20, permitting axle 20 to rotate in the aperture. Sleeve portion 64 does not rotate. Axle 20 extends through sleeve portion 64 and into cover portion 30, ending inside socket 46 where the distal end 44 of axle 20 is held. If desired, a stabilizing sleeve 68 or similar device may be formed inside the cover portion 30 of wheel member 18 to support cover portion 30 further on the portion of axle 20 adjacent to distal end 44 of axle 20.

A clamp 70, similar to clamp 48, is mounted on axle 20 adjacent to outer end 72 of sleeve portion 64. Clamp 70 prevents sleeve portion 64 and hub 62 from moving along axle 20 away from cover portion 30, thereby maintaining first track 38 of axle engaging portion 28 fully engaged upon, and slideable in, second track 40 of cover portion 30.

In order to keep axle-engaging portion 28 from rotating on axle 20, sleeve portion 64 of the hub includes one or more fins 73, which are fixed between sleeve portion 64 and exterior surface 32 of axle engaging portion 28. A hub lock 74 that is mounted on axle 20 includes a tubular center portion surrounding axle 20 and a first end, which engages fins 73 with fingers 76. Fingers 76 prevent fins 73 from turning around axle 20 independently from hub lock 74. A second end of hub lock 74 is provided with a rectangular plate 78, which is fixed to the tubular center portion of hub lock 74 and moveable only along with the tubular center portion and fingers 76. Hub lock 74 thus controls rotation of axle engaging portion 28 of wheel assembly 18 as fingers 76 are engaged on fins 73. Axle engaging portion 28 and hub lock 74 can only rotate on axle 20 as a unit.

FIG. 7 is an enlarged sectional view of the circled portion of the wheel shown in FIG. 6. Cap 86 is provided with a rotating disk-shaped member 88 with teeth 90 to engage ledges 92 formed in the cover member 30 along the edges of port 84. The external side of cap 86 includes a recessed lock-operating member 94, which is designed to be difficult to operate without a specially adapted tool.

Figure 7A:
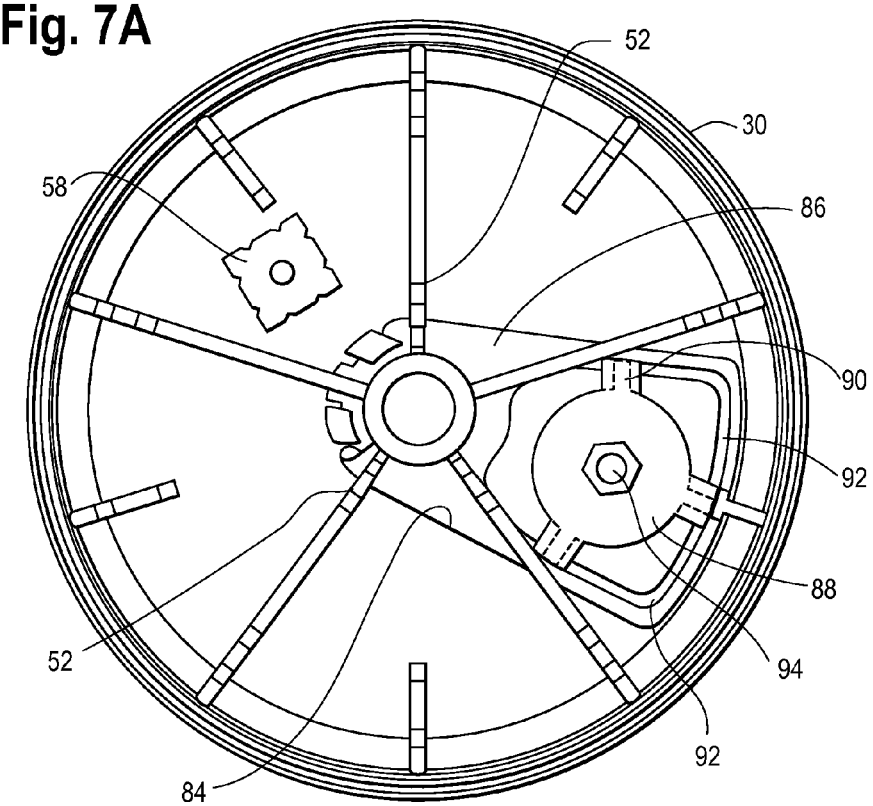
FIG. 7A is a sectional view of the wheel shown in FIG. 5 taken along the line 7A-7A in FIG. 5 and showing a locking mechanism in a closed position.

FIG. 7A is a sectional view of the wheel shown in FIG. 5 taken along the line 7A-7A in FIG. 5 and showing a locking mechanism in a closed position. Teeth 90 of rotating disk-shaped member 88 engage ledges 92 of cover portion 30. Port 84, Cap 86, ribs 52, and bait block 58 are illustrated for reference.

Figure 7B:
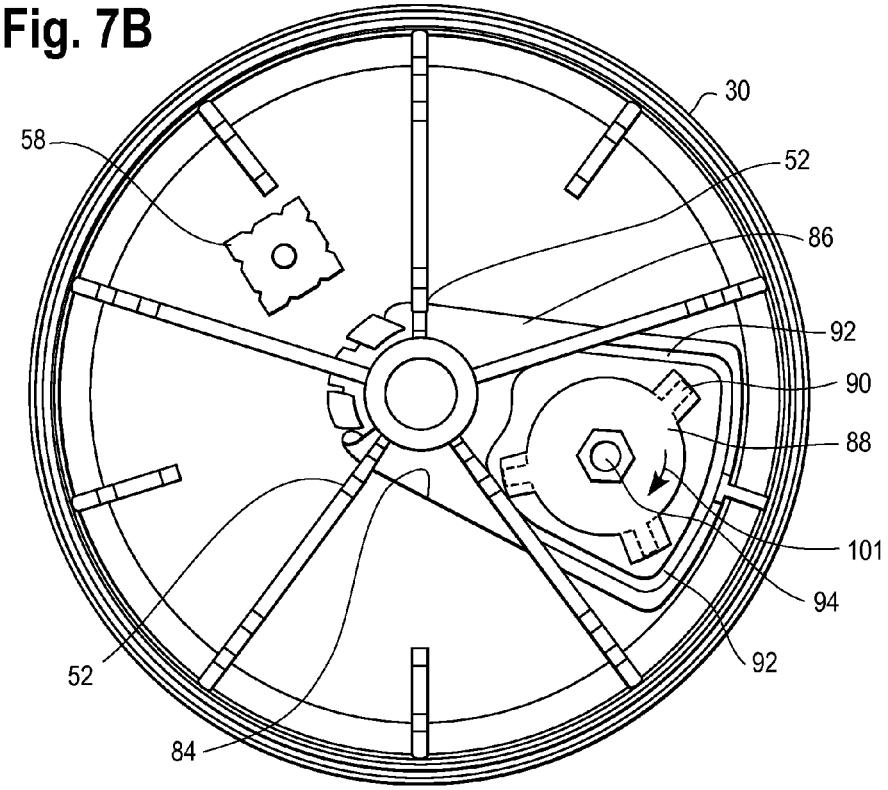
FIG. 7B is an identical sectional view of the wheel shown in FIG. 7A except showing the locking mechanism in an open position.

FIG. 7B is an identical sectional view of the wheel shown in FIG. 7A except showing the locking mechanism in an open position. Teeth 90 of rotating disk-shaped member 88 are rotated away from ledges 92 of cover portion 30. Arrow 101 illustrates the rotation. Port 84, Cap 86, ribs 52, and bait block 58 are illustrated for reference.

Figure 8:
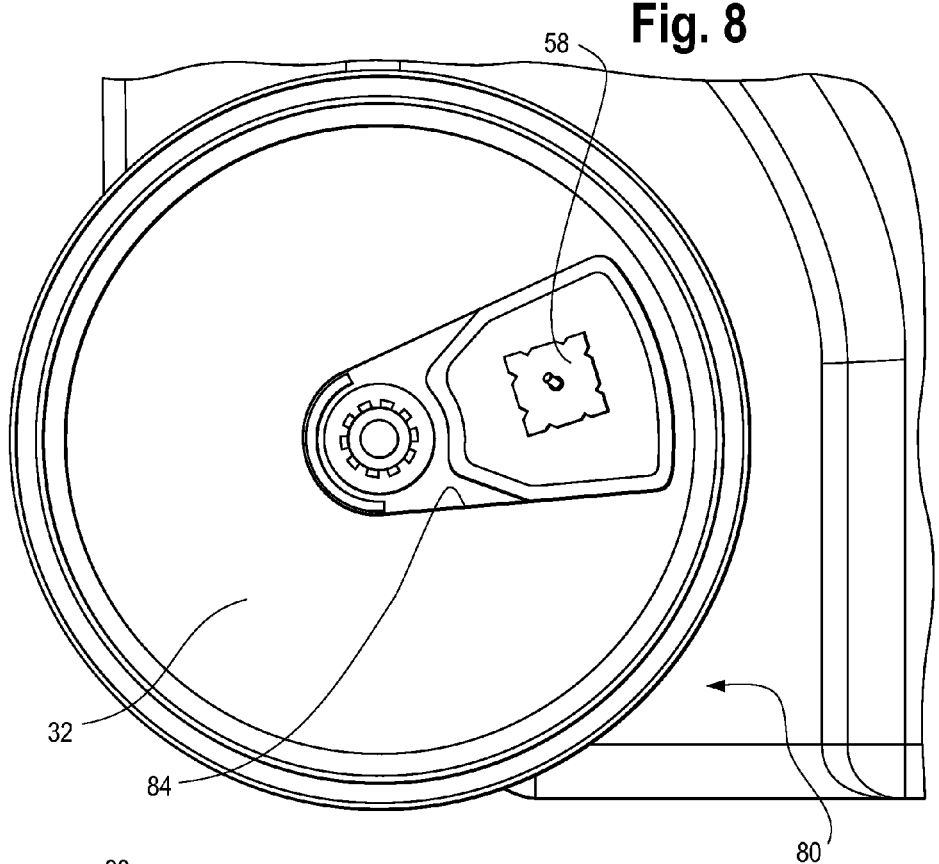
FIG. 8 is an enlarged elevational view of the second of the two garbage container wheels shown in FIG. 1.

FIG. 8 is an enlarged elevational view of the second of the two garbage container wheels shown in FIG. 1. Port 84 on exterior surface 32 exposes bait block 58. Wheel well 80 is illustrated for reference.

In order to access bait holding station 22 and replenish solid bait 58 or liquid bait 58A stored therein, port 84 is formed in cover portion 30. When the port is opened and rotated over the bait station 22, the bait inside the chamber may be readily supplemented, or new bait supplied. As also illustrated in FIGS. 3 and 3A, cap 86 for port 84 may be locked in place to keep the port closed, or unlocked in order to open the port and service the bait station. Preferably, cap 86 is provided with a rotating disk-shaped member 88 with teeth 90 to engage ledges 92 formed in the cover member 30 along the edges of port 84. Preferably, also, the external side of cap 86 includes recessed lock-operating member 94, which is designed to be difficult to operate without a specially adapted tool. Member 94 utilizes outwardly facing indented engagement dimples 96 which must be grasped by using a wrench-type tool 98 having prongs 100 that fit the dimples. Engaging prongs 100 in dimples 96 and then twisting tool 98 releases teeth 90 of cap 86 from ledges 92 and permits a service person to withdraw cap 86 from port 84. Cap 86 and its associated lock-operating member 94 maintain the cap 86 in position closing port 84 when teeth 90 are engaged with ledges 92, thereby keeping non-targeted animals and unauthorized persons from reaching the bait.

Figure 9:
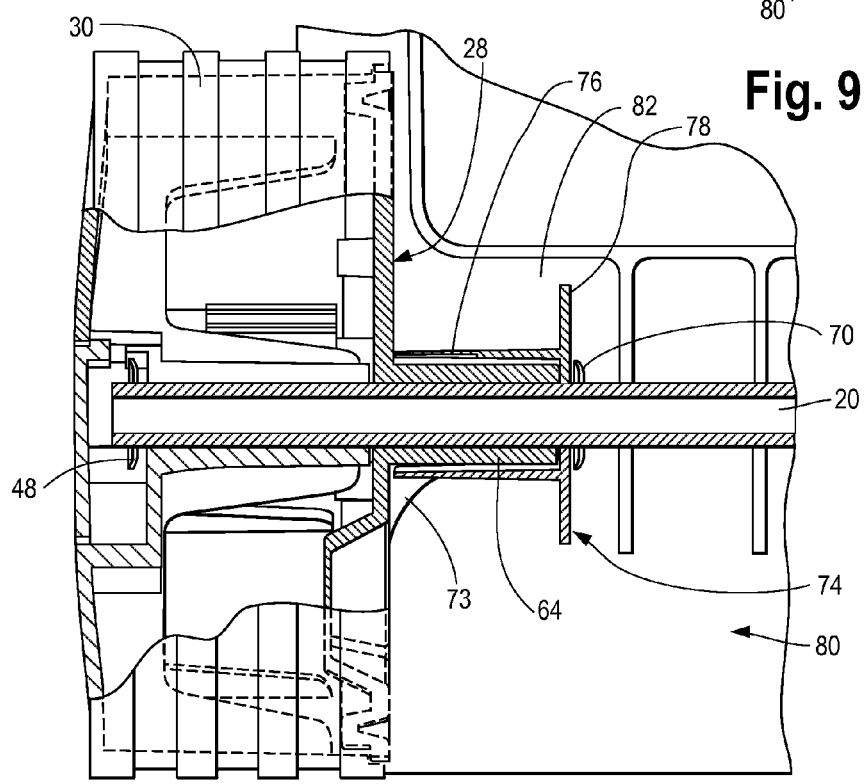
FIG. 9 is a sectional view of the garbage container wheel shown in FIG. 8 and also showing the mounting of the wheel on the container.

FIG. 9 is a sectional view of the garbage container wheel shown in FIG. 8 and also showing the mounting of the wheel on the container. As shown in FIG. 9, plate 78 on hub lock 74 is mounted on axle 20 in wheel well 80 of garbage storage member 12 adjacent to a wall portion 82 of the storage member. Plate 78 engages wall portion 82 before plate 78 can accomplish any substantial amount of rotation. Wall portion 82 therefore acts as a stop member for hub lock 74, preventing the hub lock 72 from rotating around axle 20. Since hub lock 72 and axle-engaging portion 28 turn as a unit, axle-engaging portion 28 is also prevented from rotating around axle 20.

Other forms of a hub lock may be used to prevent axle engaging portion 28 from rotating, but it will be noted, particularly from FIG. 9, that when the form of hub lock and its related assembly just described are used, clamp 70 and hub lock 74 cooperate not only in fixing axle engaging portion 28 of wheel member 18 in non-rotational engagement on axle 20, but the hub lock engagement on fins 73 also maintains the position of axle engaging portion 28 of wheel member 18 on the axle 20 during rotation of the cover portion 30 as garbage container 10 is moved from place to place.

Figure 10:
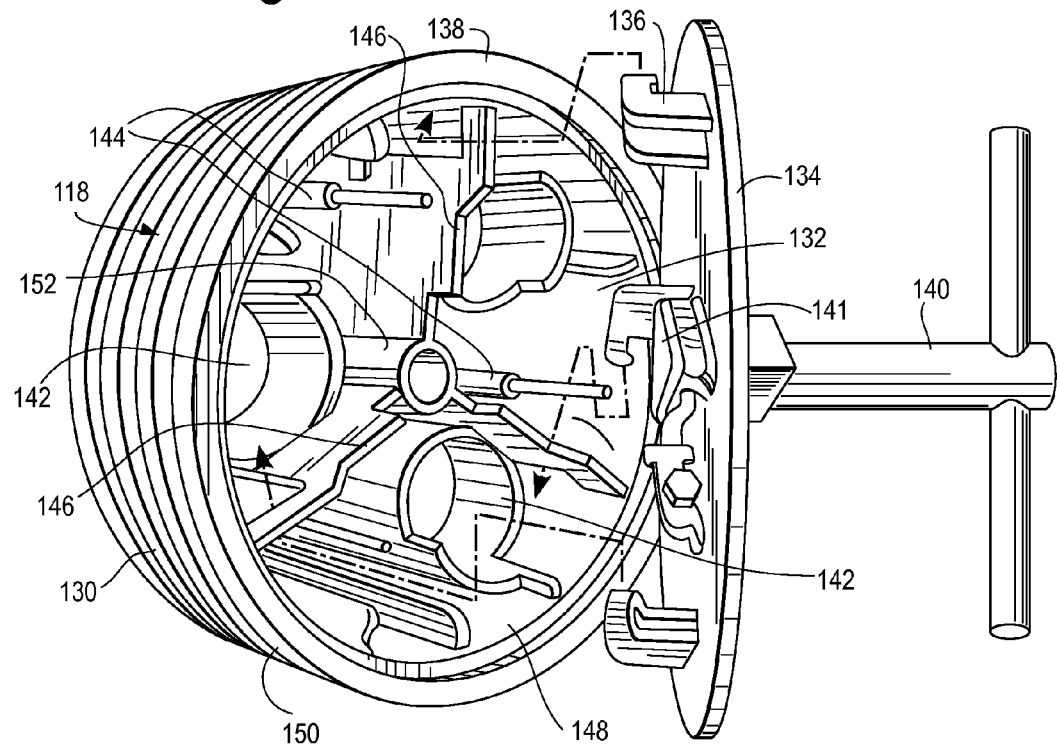
FIG. 10 is a perspective view, partly disassembled, of an alternative example of the garbage container wheels shown in FIG. 1.
Figure 11:
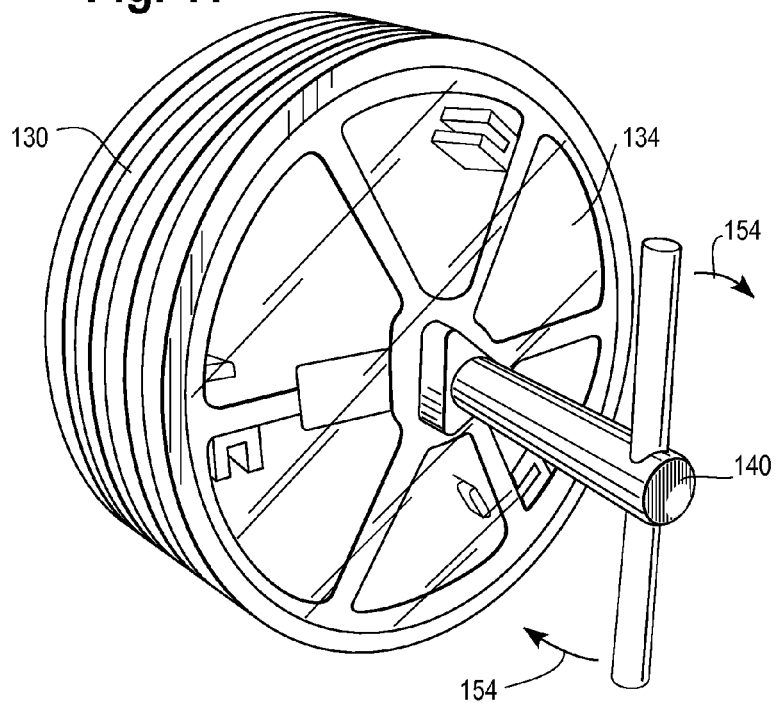
FIG. 11 is a perspective view of the garbage container wheel, assembled, shown in FIG. 10.

An alternative form of wheel member 118 for a garbage container is illustrated in FIGS. 10 and 11. FIG. 10 is a perspective view, partly disassembled, of an alternative example of the garbage container wheels shown in FIG. 1. FIG. 11 is a perspective view of the garbage container wheel, assembled, shown in FIG. 10.

A labyrinthine chamber interior surface 132 on axle-engaging portion 130 forms bait holding stations inside a wheel member 118. A cover portion 134 overlies interior surface 132 to complete the chamber. Cover portion 134 includes locking members 136 which engage cover portion 134 onto axle engaging portion 130 by moving locking members 136 of cover portion 134 under a lip 138 adjacent the inside perimeter of axle-engaging portion 130. In this example, a special wrench like tool 140 is utilized to operate a latch 141 inside the chamber and unlock cover portion 134 in order to remove it from axle-engaging portion 130.

Entrance apertures 142 are provided in axle-engaging portion 130 for admitting targeted pests into wheel member 118. Bait stations 144 are located adjacent to rib members 146 in stalls 148 inside the internal chamber of wheel member 118. Rib members 146 also support and strengthen tread surface 150 of axle-engaging portion 130 of wheel member 118. It will be noted that in the example of FIGS. 10 and 11 axle engaging portion 130 and cover portion 134 utilize an axle receiving sleeve 152 in the center of axle engaging portion 130 as the basis for rotating as a unit on an axle of a garbage container.

Although the description above contains many specifications, these should not be construed as limiting the scope of the invention but as merely providing illustrations of some of the presently preferred embodiments of this present invention. Persons skilled in the art will understand that the method and apparatus described herein may be practiced, including but not limited to, by the embodiments described. Further, it should be understood that the invention is not to be unduly limited to the foregoing which has been set forth for illustrative purposes. Various modifications and alternatives will be apparent to those skilled in the art without departing from the true scope of the invention, as defined in the following claims. While there has been illustrated and described particular embodiments of the present invention, it will be appreciated that numerous changes and modifications will occur to those skilled in the art, and it is intended for those changes and modifications to fall within the true spirit and scope of the present invention.

INDUSTRIAL APPLICABILITY

Accordingly, various examples of the invention may offer one or more of the following objects or advantages, illustrating industrial applicability.

One object is to provide a bait station, which can be readily moved from a storage location to a collection site, intercepting rodents or other pests as they appear.

Another object is to provide a bait station, which is readily serviceable.

Another object is to provide a bait station, which is readily accessible to pests but not readily accessible to children, non-targeted pets, and non-targeted wildlife.

Another object is to provide a bait station, which is associated with a garbage canister, which attracts pests but does not expose the poisoned bait to the personnel who pick up and empty the garbage container.

Another object is to provide a bait station, which attracts pests for the purpose of monitoring and tracking pest prevalence.

What is claimed is:

1. A system comprising:
   means for maintaining a bait station separable from a mobile container in rotatable connection with the mobile container, the maintaining means comprising:
   the bait station configured and arranged as a wheel;
   a rib member disposed in an internal chamber of the wheel; and
   a bait holding station configured and arranged to receive a poisoned bait, the bait holding station disposed adjacent to the rib member inside said wheel accessible to pests through an opening into said wheel;
   means for securing bait in said bait station from spillage during motion of the mobile container; and
   means for accessing the bait;
   wherein the means for securing bait in said bait station from spillage during motion of said mobile container comprises:
   an axle engaging portion of the wheel having an exterior surface and an interior surface;
   a cover portion overlying said interior surface of said axle engaging portion of the wheel; and
   a chamber disposed inside the wheel between said axle engaging portion and said cover portion; and
   wherein the axle engaging portion of the wheel further comprises a first track along an outer perimeter of the axle engaging portion of the wheel;
   the cover portion of the wheel further comprises a second track; and
   the second track is disposed in and rotationally moveable along the first track, thereby providing rotational mobility of the cover portion.

2. The system of claim 1 wherein said means for maintaining a bait station separable from a mobile container in rotatable connection with said mobile container further comprises:
   a storage member; and
   a wheel assembly supporting said storage member, the wheel assembly comprising:
   said wheel; and
   an axle joining said wheel to said storage member.

3. A system comprising:
   means for maintaining a bait station separable from a mobile container in rotatable connection with the mobile container;

means for securing bait in the bait station from spillage during motion of the mobile container;
means for accessing the bait;
means for concealing the bait station; and
wherein the concealing means comprises:
  the bait station configured and arranged as a wheel;
  a rib member disposed in an internal chamber of the wheel; and
  a bait holding station configured and arranged to receive a poisoned bait, the bait holding station disposed adjacent to the rib member inside the wheel accessible to pests through an opening into said wheel;
wherein the means for securing bait in said bait station from spillage during motion of said mobile container comprises:
  an axle engaging portion of the wheel having an exterior surface and an interior surface;
  a cover portion overlying said interior surface of said axle engaging portion of the wheel; and
  a chamber disposed inside the wheel between said axle engaging portion and said cover portion; and
wherein the axle engaging portion of the wheel further comprises a first track along an outer perimeter of the axle engaging portion of the wheel;
  the cover portion of the wheel further comprises a second track; and
  the second track is disposed in and rotationally moveable along the first track, thereby providing rotational mobility of the cover portion.

4. The system of claim 3 further comprising:
means for protecting the bait from contamination.

* * * * *